(12) United States Patent
Wegner et al.

(10) Patent No.: US 9,079,567 B2
(45) Date of Patent: Jul. 14, 2015

(54) WIPER MOTOR CONTROL

(75) Inventors: Nobert Wegner, Buehl (DE); Joachim Zimmer, Changsha (CN)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 13/579,189

(22) PCT Filed: Dec. 20, 2010

(86) PCT No.: PCT/EP2010/070190
§ 371 (c)(1),
(2), (4) Date: Nov. 30, 2012

(87) PCT Pub. No.: WO2011/098184
PCT Pub. Date: Aug. 18, 2011

(65) Prior Publication Data
US 2013/0093364 A1 Apr. 18, 2013

(30) Foreign Application Priority Data
Feb. 15, 2010 (DE) .......................... 10 2010 001 920

(51) Int. Cl.
*H02P 7/00* (2006.01)
*B60S 1/08* (2006.01)

(52) U.S. Cl.
CPC .... *B60S 1/08* (2013.01); *H02P 7/00* (2013.01)

(58) Field of Classification Search
USPC ...................... 318/162, 163, 164, 400.12, 443
See application file for complete search history.

(56) References Cited

U.S. PATENT DOCUMENTS

| | | | |
|---|---|---|---|
| 4,866,357 A | 9/1989 | Miller et al. | |
| 4,900,996 A * | 2/1990 | Wainwright | 318/443 |
| 5,166,587 A * | 11/1992 | Smart | 318/444 |
| 5,909,096 A * | 6/1999 | Detais | 318/282 |
| 6,703,804 B1 | 3/2004 | Courdier et al. | |
| 6,851,157 B2 | 2/2005 | Zimmer | |
| 7,420,346 B2 * | 9/2008 | Metz | 318/443 |
| 2003/0020422 A1 | 1/2003 | Schmid et al. | |
| 2009/0282636 A1 | 11/2009 | Braun et al. | |

FOREIGN PATENT DOCUMENTS

| | | |
|---|---|---|
| DE | 102005048343 | 4/2007 |
| JP | H08225062 | 9/1996 |
| JP | 2000516558 | 12/2000 |
| JP | 2004114748 | 4/2004 |

OTHER PUBLICATIONS

PCT/EP2010/070190 International Search Report dated Mar. 28, 2011 (2 pages).

* cited by examiner

*Primary Examiner* — Bentsu Ro
(74) *Attorney, Agent, or Firm* — Michael Best & Friedrich LLP

(57) ABSTRACT

The invention relates to a wiper motor control for controlling a wiper motor that moves a wiper arm in a pendulum motion between two turning positions, said wiper motor control being designed to control a speed of the wiper arm dependent on a position of the wiper arm. The speed of the wiper arm in turning regions, which comprise the turning positions, follows a specified progression independent of the speed of the wiper arm between the turning regions.

9 Claims, 5 Drawing Sheets

WIPER MOTOR CONTROL

BACKGROUND OF THE INVENTION

Wiper systems, as they are used, for example, in motor vehicles, serve to keep a window pane free of moisture and contaminations. To meet this end, a wiper blade on a wiper arm is usually guided across the window pane. The wiper arm is moved in an oscillating manner around a point of rotation so that the wiper blade covers an approximately circularly segmented region of the window pane.

In order to control a drive motor for the wiper arm, different approaches are known from prior art. Provision is made in the German patent publication DE 10 2006 061 679 A1 to drive the drive motor in such a way that a wiping frequency is dependant on a size of a load on the drive motor. In this way, the window pane is wiped more seldomly by the wiper blade if said window pane is almost dry.

Provision is made in the German patent publication DE 10 2005 048 343 A1 for the drive motor to be actuated such that a lower region of the window pane is wiped faster by the wiper blade than an upper region. In so doing, a wiper availability can be increased in a visibility region of the window pane.

In the German patent publication DE 100 24 255 A1, the wiper motor control is designed such that turning positions of the drive motor can be controlled as a function of a wind speed in the region of the wiper blade in such a way that the region of the window pane being wiped by the wiper blade remains constant.

SUMMARY OF THE INVENTION

The aim underlying the invention is to specify a wiper motor control, which facilitates an improved wiping at a lower wiping frequency.

In order to actuate a wiper motor which moves a wiper arm in a pendulum motion between two turning positions, a wiper motor control is designed to control a speed of the wiper arm dependant on a position of said wiper arm, wherein the speed of said wiper arm in turning regions, which comprise the turning positions, follows a specified progression independent of the speed of said wiper arm between the turning regions.

A reduction in the speed of the wiper arm in a region between the turning positions can therefore be implemented without a rattling or clattering of a wiper blade attached to the wiper arm being produced as a result of too low a speed of said wiper arm. A very low wiper frequency can thus be achieved in the continuous wiper operation without having to accept noise emissions, a reduction in wiping quality and premature wear to the surface of the window pane or other parts of the wiper system as a result of the rattling or clattering of the wiper blade.

The progression of the speed in the turning regions can substantially follow a sine function. This speed progression can keep the mechanical stress on one or all of the parts of the wiper system low.

Between the turning regions, the speed of the wiper arm can be less than the maximum of the sinus function. The advantages of the sinusoidal speed progression in the turning regions can thus be combined with a lower speed between said turning regions.

The wiper motor can be coupled to the wiper arm by means of a crank mechanism and the wiper motor control can be equipped for the purpose of keeping the rotational speed of the wiper motor constant while the wiper arm is located in one of the turning regions. In this way, conventional wiper mechanics can be used in order to support a sinusoidal speed progression of the wiper arm.

The wiper motor control can be equipped to keep the rotational speed of the wiper motor at a lower speed between the turning regions than in the turning regions. A sinusoidal speed progression having an extended period of the sinus function results thereby in the region between the turning regions. This type of actuation is simple and cost effective to implement and can contribute to minimizing the mechanical stress on the wiper system.

The wiper motor control can furthermore comprise a device for determining whether a power consumption of the wiper motor lies above a predetermined threshold value. The control of the speed of the wiper arm can therefore first be carried out in the described manner if, e.g., the concrete danger of rattling exists due to high friction between the wiper blade and the window pane.

In addition, the wiper motor control can comprise a device for determining whether a time that elapses until the wiper arm is moved from one turning position to the other turning position lies above a predetermined threshold value. The specific speed control in the turning regions is advantageously carried out as a function of the result of the determination of the device only below a predetermined wiper frequency which corresponds to the predetermined time.

The wiper motor control can furthermore comprise a device for determining whether a wind speed in the region of the wiper arm lies above a predetermined value. The wiper motor control described can thus advantageously determine a concrete rattling tendency using the wind speed and correspondingly carry out the described speed control.

A method for controlling a wiper motor, which moves a wiper arm in a pendulum motion between two turning positions, furthermore comprises steps for determining whether the wiper arm is situated in one of two turning regions, which lie around the turning positions, and steps for actuating the wiper motor such that a speed of the wiper arm in the turning region follows a rigidly specified progression independently of the speed of the wiper arm between the turning regions.

The method can advantageously be implemented in an, for example, electronic wiper motor control. The advantages of the described technology can thus be realized in a cost effective manner using existing components of a wiper system.

In addition, a computer program product comprises program code means for carrying out the described method if the computer program product is stored on a computer-readable data carrier or run on a processing device.

BRIEF DESCRIPTION OF THE DRAWINGS

The invention is now described in detail with reference to the enclosed figures, in which.

DETAILED DESCRIPTION

Figure 1:
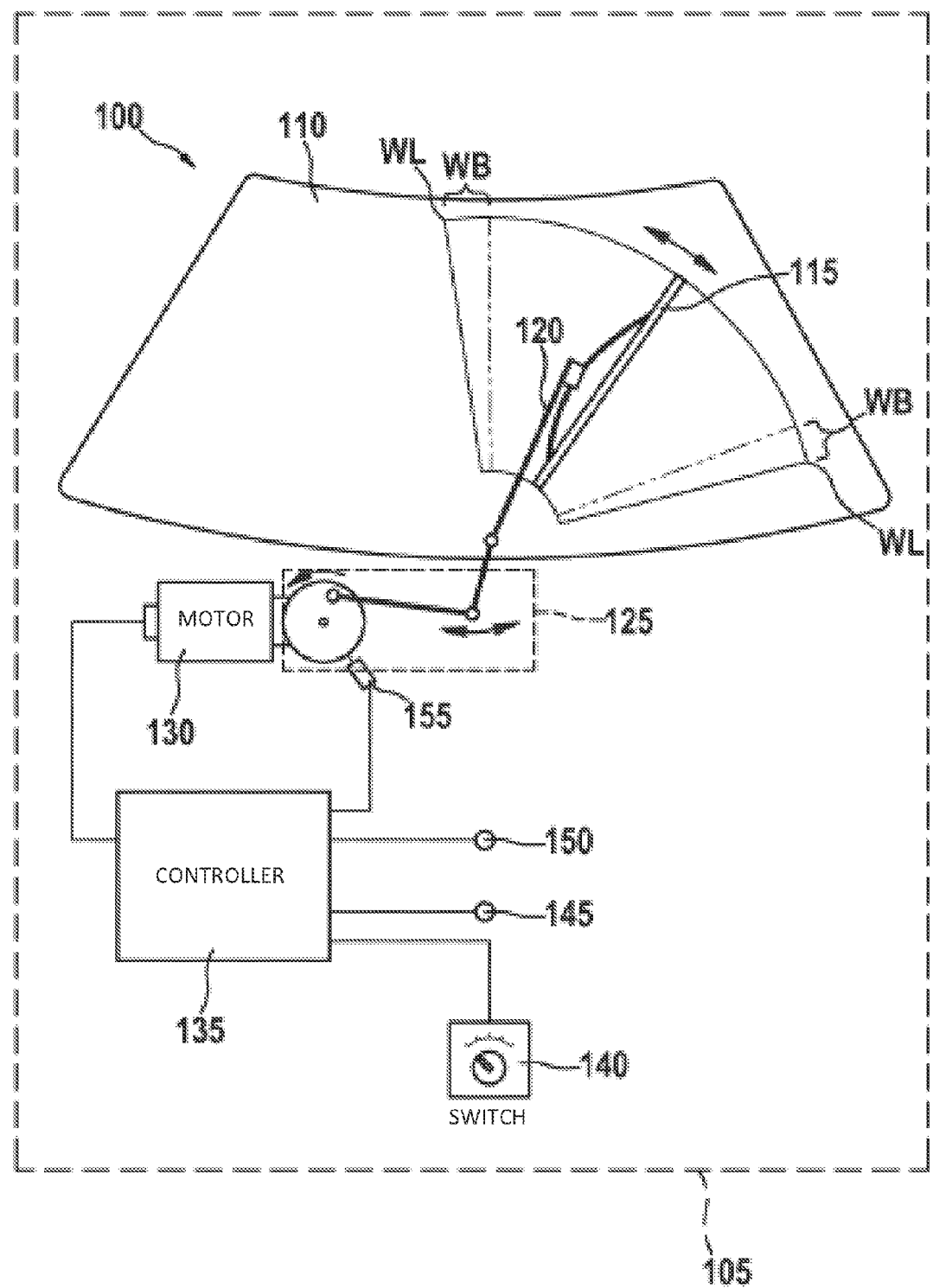
FIG. 1 shows a wiper system for a window pane of a motor vehicle.

FIG. 1 shows a wiper system 100 which is disposed in a motor vehicle 105. The wiper system 100 is equipped to clean a window pane 110 of the motor vehicle 105. The window pane can be a front windshield or a rear window of the motor vehicle 105.

A wiper blade 115 is fastened to a wiper arm 120, which moves the wiper blade 115 across the window pane 110 in an oscillating motion about a center of rotation. In so doing, the said wiper blade 115 pushes aside moisture and foreign bodies out of a circularly segmented region so that the window pane is cleaned. Further wiper arms 120 comprising further wiper blades 115 are not depicted in FIG. 1, which can be pivoted by the same crank mechanism 125 in order to clean further regions of the window pane 110.

The wiper arm 120 is driven by means of a crank mechanism 125 of a wiper motor 130. The wiper motor 130 supplies a rotational motion which is converted into an oscillating motion. Said wiper motor 130 can, for example, be in a commutated or brushless DC motor comprising or without reduction gears. Said wiper motor 130 is electrically actuated by a wiper motor control 135. The wiper motor control 135 can, for example, control a voltage, a current or a temporal duty cycle of a pulsating current supply of said wiper motor 130. The wiper motor 130 can especially control one of the electrical parameters of said wiper motor 130 and scan one or a plurality of additional electrical parameters of the wiper motor 130. Said wiper motor control 135 can, for example, control the voltage of said wiper motor 130 and thereby scan a current consumption of the wiper motor 130.

The wiper motor control 135 is connected to a selector switch 140, with which a driver of the motor vehicle 105 can select a function of a functional mode of the wiper system 100. The selector switch 140 can, for example, have a first position for turning the wiper system 100 off, a second position for wiping in the interval operation, a third position for slow continuous operation, a fourth position for fast continuous operation and a fifth position for an automatic operation.

The wiper motor control 135 is further connected to a rain sensor 145 or an interface to a rain sensor 145. Signals, which the wiper motor control 135 receives from the rain sensor 145, can, for example, influence the running of the wiper operation, in particular in positions 2 (interval) and 5 (automatic) of the selector switch 140. The signals received by the rain sensor 145 can alternatively or additionally control a transition between the operating modes which can be selected by means of the selector switch.

The wiper motor control 135 is also connected to a speed sensor 150 or to an interface to a speed sensor 150. Said wiper motor control 135 can, for example, be connected to a data bus or to an integrated control of a part of the motor vehicle 105 in order to receive a speed signal of the motor vehicle 105. The signals received using the speed sensor 105 are used by the wiper motor control 135 to control the wiping operation of the wiper system 100 as a function of a wind speed in the region of the wiper arm 120 which is associated with the speed of the motor vehicle 105.

Finally the wiper motor control 135 is connected to a position sensor 155, which scans at least one of the positions of the wiper motor 130, the crank mechanism 125 or the wiper arm 120. On the basis of the signals received by the position sensor 155, the wiper motor control 135 actuates accordingly the wiper motor 130 in different positions of the wiper arm 120.

Figure 1A:
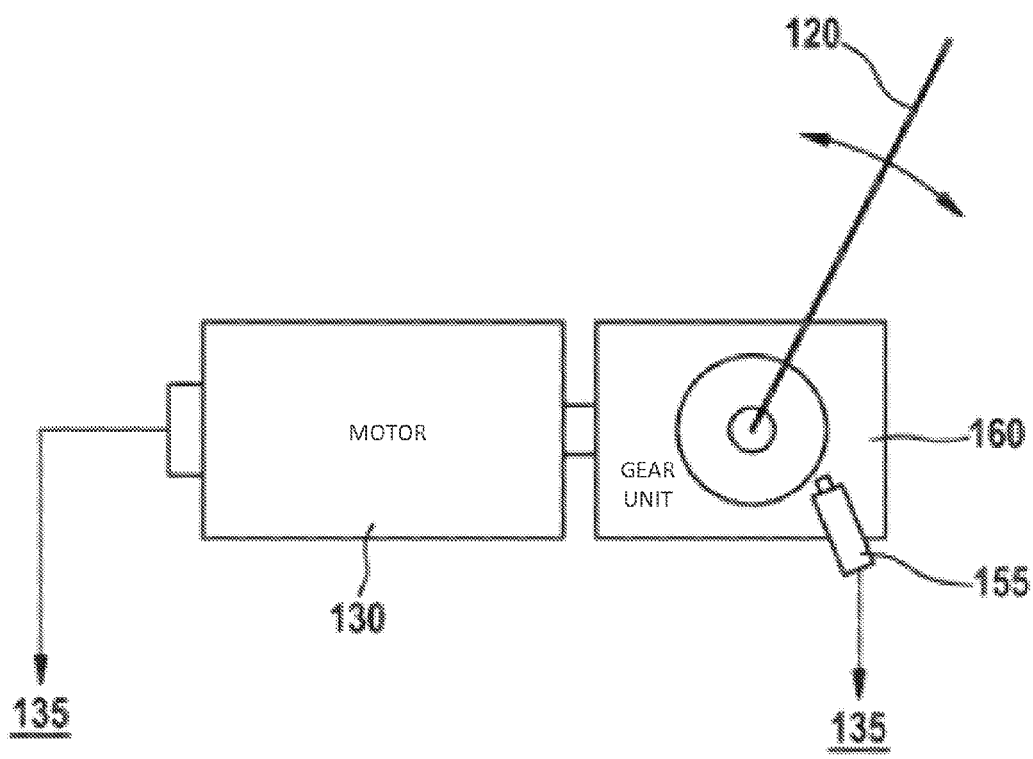
FIG. 1a shows an alternative to the crank mechanism from FIG. 1.

FIG. 1a shows a continuous gear train assembly in the form of a reduction gear unit 160 as an alternative to the crank mechanism 125 in FIG. 1; the wiper motor 130, the wiper arm 120 and the position sensor 155 being likewise depicted in FIG. 1a. The reduction gear unit 160 directly actuates the wiper arm 120, wherein in one embodiment, the axis of rotation of the wiper arm 120 coincides with the output axis of the reduction gear unit 160. An angular position of the wiper motor 130 is directly proportional to an angular position of the wiper arm 120. Such an arrangement is called a "direct drive" and is suited to the invention without restrictions.

The oscillating operation of the wiper arm 120 of FIG. 1 is achieved by controlling the rotational direction of the wiper motor 130. A speed control of said wiper motor 130 ensures a harmonic speed progression of the wiper arm 130, wherein the speed progression at least approximates the substantially sinusoidal speed progression, which is produced by the use of the crank mechanism 125 in FIG. 1. The reduction gear unit 160 can comprise a spur gear unit, planetary gear set, worm gear pair or belt drive or any other desired gearing, which produces a scaling factor of the rotational motion of the wiper motor 130 that is independent of the angle of rotation in the rotational motion of the wiper arm 120.

In other embodiments of the wiper system 100, the rain sensor 145, the speed sensor 150 and/or the position sensor 155 can also be omitted. In addition, the drive motor 130 can also act on the wiper arm 120 via a rotary gear unit, for example a spur gear unit or a planetary gear set, whereby the crank mechanism 125 is omitted. Such a wiper system is also referred to as a "direct drive".

Figure 2:
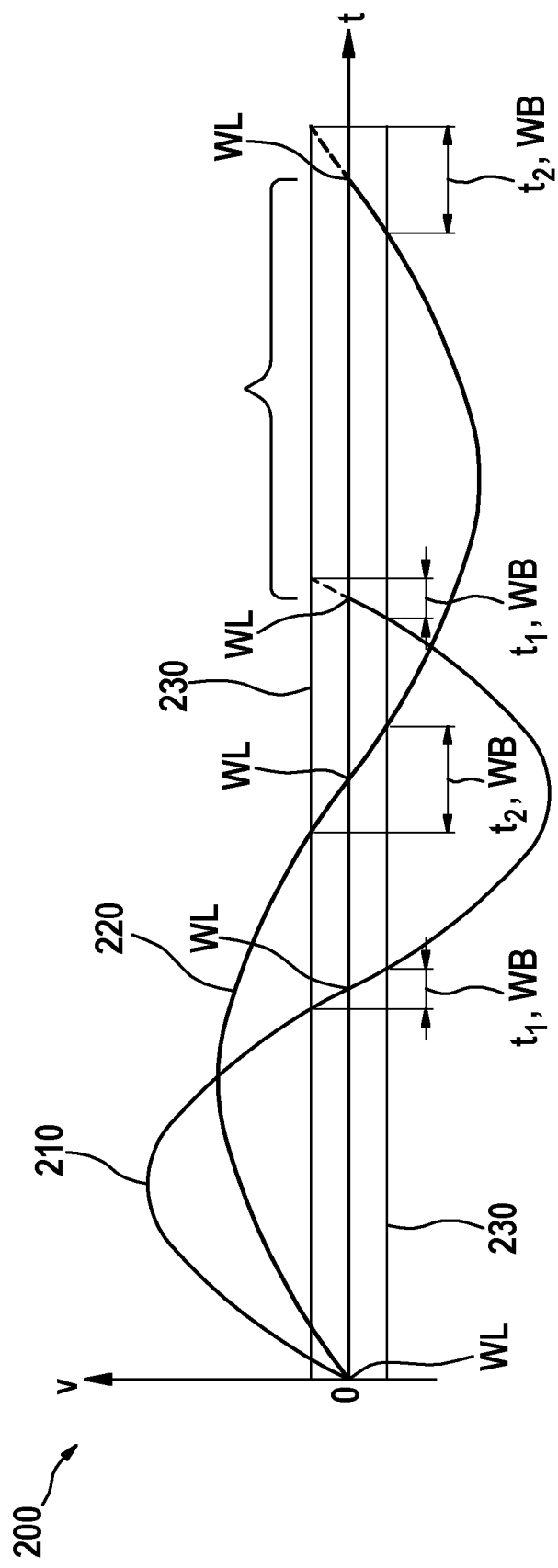
FIG. 2 shows a progression of a speed of the wiper arm from FIG. 1.

FIG. 2 shows a progression of a speed of the wiper arm 120 of the wiper system 100 from FIG. 1. A speed v is plotted in a vertical direction. In a corresponding manner, the speed v can represent an angular speed of the wiper arm 120 with respect to the window pane 110 from FIG. 1 or any desired point of the wiper blade 115 vis-B-vis said window pane 110 from FIG. 1. A time t is qualitatively plotted in a horizontal direction. In the contexts described below, a position of the wiper arm 120 could also be used as the reference value instead of the time t because the relationship between the speed v and the position of the wiper arm 120 is of significance. After the relationship between the position of the wiper arm 120 and the time t is clearly defined but is not necessarily linear, the time t is used as the reference value to facilitate understanding.

A first progression 210 depicts a speed progression of the wiper arm 120 during continuous normal operation. The speed progression 210 has the form of a sine wave, of which only one complete period is depicted. The speed is zero at the turning positions WL of the wiper arm 120. The first progression 210 occurs, for example, if in FIG. 1 the wiper motor 130 runs with a constant rotational speed and the crank mechanism 120 provides the oscillating motion of the wiper arm 120 from this uniform rotational motion. At the points, at which the first progression intersects the horizontal axis, said wiper arm 120 is situated at a turning position, i.e. at the upper most or lowest achievable position on the window pane 110 from FIG. 1.

A second progression 220 represents a decelerated operation of the wiper system from FIG. 1. The second progression 220 has the form of a sine wave which corresponds to the first progression 210 and of which only one complete period is depicted. The period of the second progression 220 is longer than that of the first progression 210 and the amplitude of the said second progression 220 is less than that of the first progression 210.

A critical speed 230 is depicted as a pair of horizontal straight lines. If the amount of speed v lies below the amount of the critical speed 230, therefore between the straight lines, the wiper blade 115 then tends to rattle. When rattling, said wiper blade 115 executes an uneven motion across the window pane 110 which negatively impacts the wiping performance. When rattling, said wiper blade 115 can be set into vibrational motion, which travels about an attachment point of said wiper blade 115 to the wiper arm 120. Such a rattling motion is thereby promoted in that the path which is wiped by the lowest point of said wiper blade 115 on the window pane 110 is much shorter than the path of the region of the window pane 110 that is wiped by the upper most point of said wiper blade 115. The tendency to rattle is additionally dependent on a frictional coefficient of said wiper blade 115 on the window pane 110. The frictional coefficient is dependent on moisture in a region between said wiper blade 115 and the window pane 110 and on the speed of said wiper blade 115 with respect to said window pane 110. The frictional coefficient increases exponentially with decreasing speed of said wiper blade 115 with respect to said window pane 110.

The first progression 210 passes through the region of the critical speed 230 within a time t1, which is substantially less than a time t2 of the second progression 220. During the decelerated operation of the second progression 220, the probability of rattling of the wiper blade 115 on the window pane is accordingly greater. In other words, the slower the wiper motor 130 runs, the more probable is a rattling of said wiper blade 115 in regions around the upper and lower turning position WL. A region, within which one of the speed progressions 210 or 220 lies in the region of the critical speed 230, is labeled as the turning region WB. The size of the turning regions WB depends on the selection of the critical speed 230.

Figure 3:
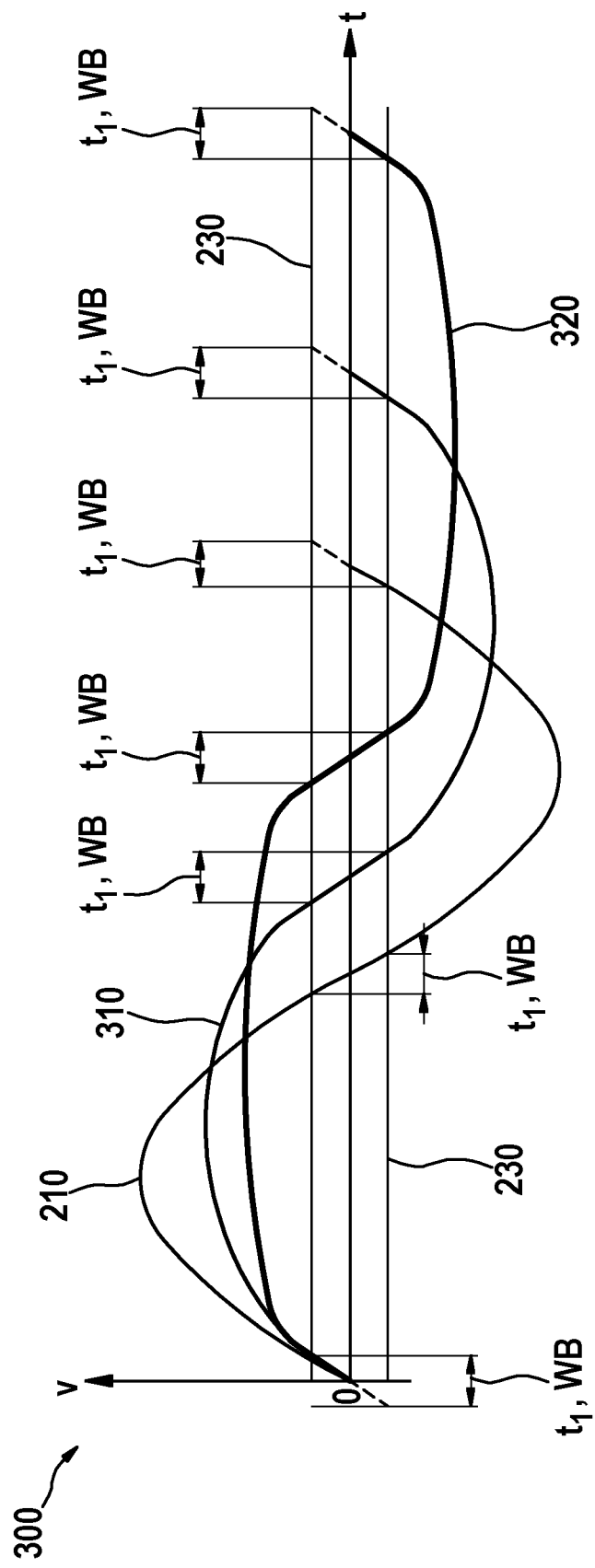
FIG. 3 shows further progressions of speeds of the wiper arm from FIG. 1.

FIG. 3 shows further advantages of speeds of the wiper arms 120 with respect to the window pane 110 from FIG. 1. The material depicted in the diagram 300 corresponds to the material depicted in FIG. 2 including the first progression 210 and the critical speed 230. In addition, a third progression 310 and a fourth progression 320 are plotted.

In the three depicted progressions 210, 310 and 320, the time t1 is identical, during which said progressions 210, 310 and 320 are situated in accordance with the amounts thereof below the critical speed 230. Within the turning regions determined by the times t1, the progressions 210, 310 and 320 correspond to the sinus function of the first progression 210. Outside of the turning regions WB, the third progression 310 and the fourth progression 320 are flattened differently with respect to the first progression 210. The speed of the wiper arm 120 or respectively the wiper blade 115 is reduced with respect to the window pane 110 up to approximately the boundary of the critical speed 230, whereby a rattling of the wiper blade 115 on the window pane 110 is still not risked. The cycle time or respectively the length of the period of the progressions 310 and 320 is thereby extended; thus enabling a cleaning of the window pane 110, even wherein few wiper periods per time unit occur, to be carried out during the continuous operation of the wiper system 100. Such a demand occurs, for example, in the case of fog or very light rain.

Figure 4:
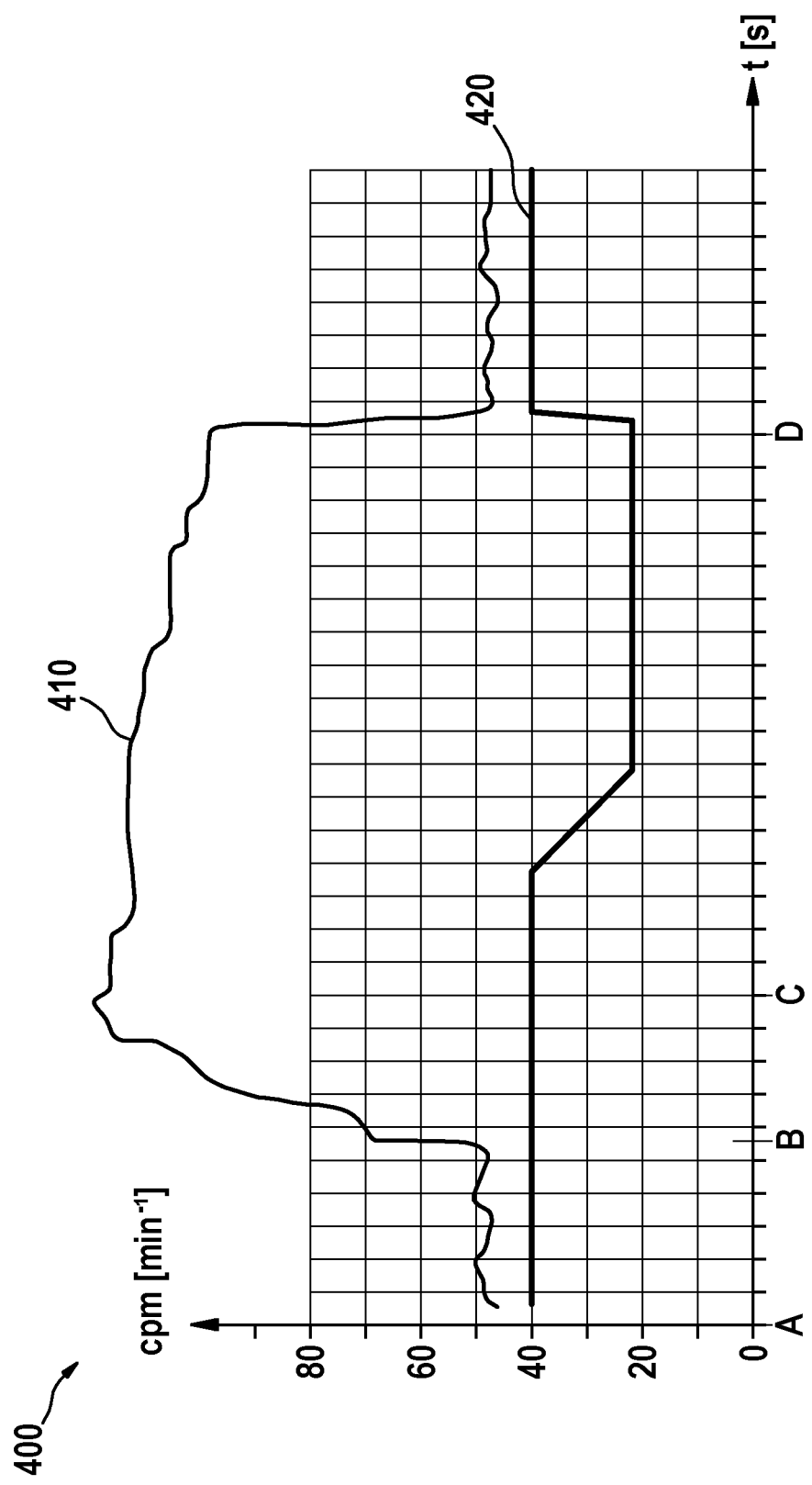
FIG. 4 shows a diagram of a load dependent wiper motor control of the wiper system from FIG. 1.

FIG. 4 shows a diagram of a load dependent wiper motor control 135 of the wiper system 100 from FIG. 1. A time t is plotted in the horizontal direction in seconds and a number of wiper cycles per minute and a wiper load (without units) is plotted in the vertical direction. A wiper cycle corresponds thereby to a full period of one of the progressions 210, 220, 310 or 320.

The window pane 110 is wet between the points in time A and B. Said window pane 110 gradually dries between the point in time B and the point in time C and then remains approximately dry up to a point in time D. At the point in time D, said window pane 110 quickly becomes wet again and remains wet up to the end of the depicted progression.

A qualitative progression 410 indicates an average mechanical load on the wiper motor 130 in FIG. 1. The load progression 410 can, for example, be determined on the basis of a current measurement of the wiper motor 130 when the voltage stays constant. The dryer the window pane is, the higher the load is in the load progression 410 so that a degree of wetness of the window pane 110 can be determined on the basis of the current measurement, and the wiping frequency can be adapted to the degree of wetness.

In a wiper system 100 which is controlled as a function of the load progression 410, the wiping cycle progression 420 results. After it has been determined by the wiper motor control 135 at the point in time C that the window pane 110 is dry, the frequency of the wiping cycles of 40 cycles per minute (cpm) is continuously lowered. With the aid of the procedure described above especially with reference to FIG. 3, it is possible to maintain a continuous wiping up to a lower limit of approximately 20 cycles per minute. That means that the wiper system 100 can still be operated in the continuous mode even at very small moisture levels of the window pane 110 instead of having to switch to the interval mode. Conventional wiper systems 100, which carry out a lowering of the wiper speed corresponding to the progression 220 in FIG. 2, do not typically operate below a cycle frequency of 40 cycles per minute while maintaining an acceptable rattle tendency of the wiper blade 115 on the window pane 110. A slow continuous operation corresponding to the third position of the selection switch 140 in FIG. 1 typically corresponds to approximately 40 to 45 cpm, a faster continuous operation corresponding to the fourth position of the selection switch 140 in FIG. 1 to approximately 60 to 70 cpm.

After the window pane 110 has been wetted at the point in time D, the wiper cycle progression 420 increases correspondingly sharply to a value of approximately 40 cycles per minute. The absolute numbers of cycles that are depicted are used by way of example and should not be seen as a limiting factor.

The invention is suited to actuating a wiper motor preferably on board of a motor vehicle 105; however, use in other means of transportation such as ships or airplanes or in a stationary operation is also possible.

The invention claimed is:

1. A wiper motor control (135) for controlling a wiper motor (130) that moves a wiper arm (120) in a pendulum motion between two turning positions (WL), said wiper motor control (135) configured to control a speed of the wiper arm (120) dependent on a position of said wiper arm (120), characterized in that the speed of the wiper arm (120) in turning regions (WB), which comprise the turning positions (WL), follows a specified progression (210, 310, 320) independent of the speed of the wiper arm (120) between the turning regions (WB), wherein the wiper motor (130) is coupled to the wiper arm (120) by a crank mechanism (125) and the wiper motor control (135) is equipped to maintain the rotational speed of the wiper motor (130) constant while the wiper arm (120) is situated in one of the turning regions (WB), and the rotational speed of the wiper motor (130) between the turning regions (WB) is maintained constant at a lower speed than in the turning regions (WB).

2. The wiper motor control (135) according to claim 1, characterized in that the progression (210, 310, 320) of the speed in the turning regions (WB) follows substantially a sine function (210).

3. The wiper motor control (135) according to claim 2, characterized in that the speed of the wiper arm (120) between the turning regions (WB) is less than the maximum of the sine function (210).

4. The wiper motor control (135) according to claim 1, wherein the wiper motor (130) is coupled to the wiper arm (120) by a continuous gear train assembly (160).

5. The wiper motor control according to claim 1, which further comprises a device for determining whether a power consumption of the wiper motor lies above a predetermined threshold value.

6. The wiper motor control (135) according to claim 1, which further comprises a device (135) for determining whether a time that elapses until the wiper arm (120) moves from one turning position (WL) to the other turning position (WL) lies above a predetermined threshold value.

7. The wiper motor control (135) according to claim 1, which further comprises a device (150) for determining whether a wind speed in the region of the wiper arm (120) lies above a predetermined value.

8. A method for controlling a wiper motor (130), which moves a wiper arm (120) in a pendulum motion between two turning positions (WL), wherein the method comprises:

determining whether the wiper arm (120) is situated in one of two turning regions (WB), which lie around the turning positions (WL), and actuating the wiper motor (130) such that a speed of the wiper arm (120) in the turning region (WB) follows a rigidly specified progression independent of a speed of the wiper arm (120) between the turning regions (WB);

wherein a wiper motor control (135) maintains the rotational speed of the wiper motor (130) constant while the wiper arm (120) is situated in one of the turning regions (WB), and the rotational speed of the wiper motor (130) between the turning regions (WB) is maintained constant at a lower speed than in the turning regions (WB).

9. A computer program product comprising program code means for carrying out the method according to claim 8 if the computer program product is stored on a non-transient computer readable data carrier and runs on a processing device (135).

* * * * *